US008714881B2

(12) United States Patent
Gagliano (10) Patent No.: US 8,714,881 B2
(45) Date of Patent: May 6, 2014

(54) MULTIPLE PILE FOUNDATION LOCKING SYSTEMS (76) Inventor: Richard J. Gagliano, Gig Harbor, WA (US)

( * ) Notice: Subject to any disclaimer, the term of this patent is extended or adjusted under 35 U.S.C. 154(b) by 0 days.

(21) Appl. No.: 13/611,259

(22) Filed: Sep. 12, 2012

(65) Prior Publication Data
US 2013/0272802 A1 Oct. 17, 2013

Related U.S. Application Data (60) Provisional application No. 61/625,462, filed on Apr. 17, 2012.

(51) Int. Cl.
E02D 5/28 (2006.01)
E02D 5/72 (2006.01)
E02D 27/42 (2006.01)
E02D 31/02 (2006.01)
E02D 35/00 (2006.01)
E02D 27/32 (2006.01)
E02D 5/30 (2006.01)

(52) U.S. Cl.
USPC ............ 405/231; 405/227; 405/229; 405/257

(58) Field of Classification Search
USPC .......................... 405/229, 231, 227; 52/293.3
See application file for complete search history.

(56) References Cited

U.S. PATENT DOCUMENTS

| | | | | |
|---|---|---|---|---|
| 1,334,053 A | * | 3/1920 | Reynolds | 52/152 |
| 1,504,899 A | * | 8/1924 | Quinn et al. | 52/158 |
| 1,567,703 A | * | 12/1925 | Broyles | 244/115 |
| 1,808,633 A | * | 6/1931 | Carver | 52/158 |
| 2,663,915 A | * | 12/1953 | Dietrich | 52/155 |
| 2,675,680 A | * | 4/1954 | Emshwiller | 405/208 |
| 4,052,827 A | * | 10/1977 | Yancey | 52/156 |
| 4,553,792 A | * | 11/1985 | Reeve | 384/26 |
| 4,554,767 A | * | 11/1985 | Ikonomou | 52/167.9 |
| 4,706,921 A | * | 11/1987 | Paulin | 248/545 |
| 5,039,256 A | * | 8/1991 | Gagliano | 405/244 |
| 5,243,795 A | * | 9/1993 | Roberts | 52/158 |
| 5,395,184 A | * | 3/1995 | Gagliano | 405/229 |
| 5,746,036 A | * | 5/1998 | Angelette | 52/295 |
| 5,775,847 A | * | 7/1998 | Carlinsky et al. | 405/229 |
| 5,873,679 A | * | 2/1999 | Cusimano | 405/231 |
| 5,980,162 A | * | 11/1999 | McCown | 405/244 |
| 6,079,905 A | * | 6/2000 | Ruiz et al. | 405/230 |
| 6,345,474 B1 | * | 2/2002 | Triplett | 52/169.9 |
| 6,578,333 B1 | * | 6/2003 | Gagliano | 52/295 |

(Continued)

FOREIGN PATENT DOCUMENTS

| | | | | |
|---|---|---|---|---|
| JP | 58143023 A | * | 8/1983 | E02D 27/20 |
| JP | 2005-299215 | * | 10/2005 | E02D 5/28 |
| JP | 2005-299215 A | | 10/2005 | |

Primary Examiner — John Kreck
Assistant Examiner — Edwin Toledo-Duran
(74) Attorney, Agent, or Firm — Troutman Sanders LLP (57) ABSTRACT Low environmental impact, surface installed, multiple pile foundation locking systems providing stable connection between above ground structures and the earth, having a plurality of driving holes in an engineered component through which piles may be driven into the surrounding soil and locked in a predetermined position to create, in differing configurations, the necessary resistances to any combination or relative proportions of bearing, uplift and lateral loads associated with such structures. The piles are driven at predetermined angles relative to the supported structure, consistent with its loading characteristics, and are locked in the driving holes through which they pass, further binding in their configuration under load.

18 Claims, 8 Drawing Sheets

(56) References Cited

U.S. PATENT DOCUMENTS

| | | | |
|---|---|---|---|
| 6,702,522 B2 * | 3/2004 | Silber | 405/229 |
| 6,735,911 B1 * | 5/2004 | Alexander | 52/155 |
| 6,910,832 B2 * | 6/2005 | Gagliano et al. | 405/231 |
| 7,076,925 B2 * | 7/2006 | Gagliano | 52/155 |
| 7,326,003 B2 * | 2/2008 | Gagliano | 405/229 |
| 2007/0224001 A1 * | 9/2007 | Gagliano | 405/229 |
| 2009/0003938 A1 * | 1/2009 | Nishimori | 405/232 |
| 2009/0214301 A1 * | 8/2009 | Heindl | 405/285 |

* cited by examiner

MULTIPLE PILE FOUNDATION LOCKING SYSTEMS

PRIORITY CLAIM

This application claims priority to U.S. Provisional Application No. 61/625,462 filed Apr. 17, 2012, the entire contents of which are herein incorporated by reference.

FIELD OF THE INVENTION

The present invention relates to a multiple pile foundation system for surface structures. More specifically, the present invention relates to the application of one or more engineered components having specifically delineated openings or shapes for receiving complementing elongated piles at oblique angles relative to a structural load, forming a foundation system capable of transferring to the earth, surface loads comprised of bearing, uplift, and lateral forces.

BACKGROUND OF THE INVENTION

The search for less expensive, more effective, and more environmentally sound methods of creating building foundations for new construction on previously undisturbed or undesirable building sites has led to the development by the applicant of the Pinned Foundation System (See U.S. Pat. No. 5,039,256 incorporated herein by reference), Structure Load Transfer Systems (See U.S. Pat. No. 5,395,184 incorporated herein by reference), and Surface Structures and Methods Thereof (See U.S. Pat. No. 6,910,832 incorporated herein by reference). These systems are an important advance in foundation engineering and have expanded the availability of many sites for surface structures.

Most foundation systems used in significant structure support require substantial amounts of concrete and excavation. The use of concrete or other cementitious material is often an unattractive option for a growing number of building solutions, and excavation can disrupt important soil function. Building sites may be sensitive to the impacts of this type of conventional construction, and cement itself—comprised of non-renewable resources—has the third largest carbon footprint in US industry.

A variety of multiple pile foundation systems, which do not rely solely on a cementitious material, minimize excavation, and provide a locking mechanism for fixing the relative position of multiple piles have been developed including U.S. Pat. No. 5,395,184 as referenced above. In addition to eliminating the need for excessive cementitious material in significant structure foundations, it is also desirable that the range of possible surface structures to which these systems can be applied is widened, and the volume and weight of the materials needed for the foundation system are reduced. The present invention was developed to fulfill these objectives.

OBJECTS AND SUMMARY OF THE PRESENT INVENTION

An object of this invention is to expand on a method for constructing a multiple pile foundation locking system, which is applicable to a wide variety of site and soil conditions, and a wide variety of surface structures.

Another object of this invention is to provide a versatile multiple pile foundation locking system which can be easily adapted for use with a variety of construction methods.

Another object of this invention is to provide a foundation system which is applicable for a wide variety of distributed load conditions, including distributed and concentrated loading.

It is also an object of this invention to provide a foundation system which is adaptable to varying combinations and proportions of bearing, lateral, and uplift loads.

A further object of this invention is to provide a foundation system which requires the use of substantially less non-renewable resources than current methods.

A further object of this invention is to provide a method for constructing a foundation system which will require substantially less site excavation, drainage control, and soil backfill for above-grade structures.

A further object of this invention is to provide a method for constructing a foundation system which causes substantially less erosion than current methods.

A further object of this invention is to provide a method of constructing a foundation system without significantly damaging or altering the moisture content, drainage characteristics or the chemical or molecular composition, or structural integrity, of the soil which it engages.

A further object of this invention is to provide a foundation system which can be installed on flat or sloping sites without altering the existing grade.

A further object of this invention is to provide a foundation system which can be installed in a variety of site soils and climate conditions, including heaving and/or expansive soils.

It is also an object of this invention to provide a multiple pile foundation locking system which is removable and reusable, and has replaceable parts.

It is also an object of this invention to provide a series of embodiments of a multiple pile foundation locking system which can be applied repeatedly as standardized construction components with specific load type(s), capacities and structural function.

It is also an object of this invention to provide a multiple pile foundation locking driven system, where the piles are of a specific predetermined length, relative to soil conditions and anticipated loads.

It is a further object of this invention to provide a foundation system which has a locking function which in some cases may be adjusted for differing loading and/or structure performance criteria.

The above and other objects of the present invention are realized in a foundation system that utilizes specifically configured components to which surface structures are attached, and applies elongated high strength piles through or engaged by these components at predetermined angles. These piles substantially engage the surrounding soil without altering its existing structure, thereby providing a high level of lateral, uplift and bearing support. The components include selectively arranged openings that allow pile-lock upon installation and tightening, insuring a highly stable foundation.

In the varying aspects of the present invention, the level of uplift, bearing and lateral support is defined by the component(s) strength, the number and length of the piles, the pile strength and the relative angles of the piles to the various load forces. In this way, a foundation can be designed and installed with minimal soil surface intrusion or subsurface disruption while providing significant support to the structure.

The foregoing features of the present invention may be better appreciated from the following detailed descriptions of specific illustrative embodiments thereof, presented in conjunction with the accompanying drawings:

DESCRIPTION OF THE DRAWINGS

Figure 1:
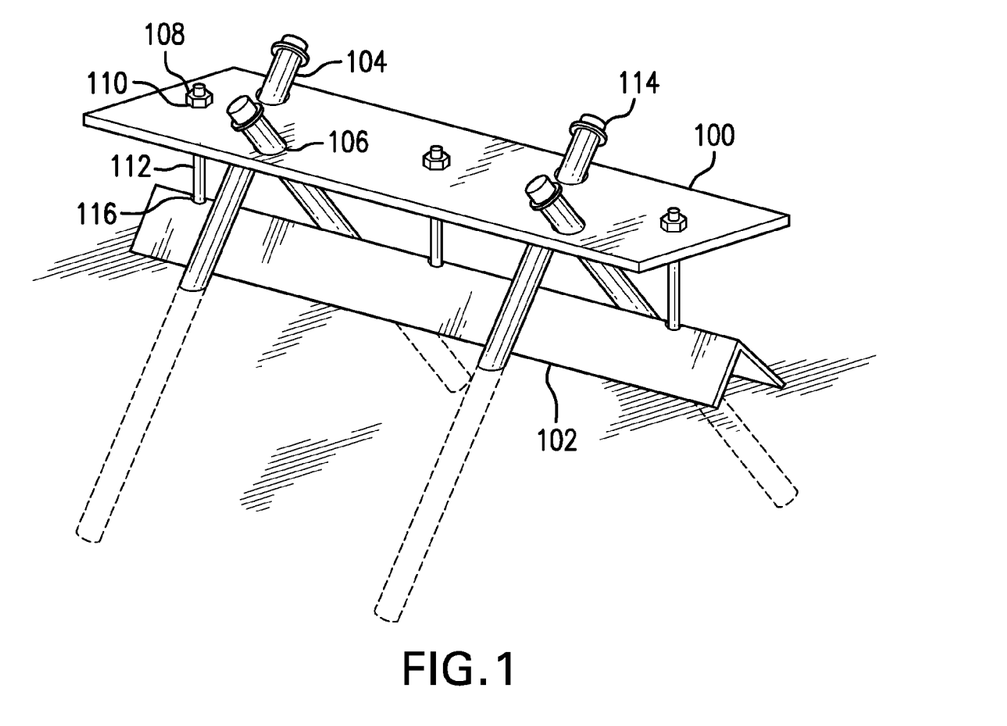

FIG. 1 is a perspective view of a distributed load version of the locked multiple pile foundation. FIG. 1 includes top plate 100, locking component 102, piles 104, elliptical holes 106, tightening nut 108, round hole 110, tightening bolt 112, pile cap 114, and round hole 116. Piles 104 are directed through elliptical holes 106 on top plate 100. Top plate 100 and locking component 102 are connected by tightening bolt 112, which passes through round holes 110 and 116 and is secured by tightening nut 108. As tightening nut 108 is tightened, the distance between top plate 100 and locking component 102 is reduced until locking component 102 engages piles 104, forcing piles 104 to bind and lock in elliptical holes 106. Pile caps 116 are provided to prevent contaminants from entering the otherwise exposed open end of the driven pipe piles 104.

Figure 2A:
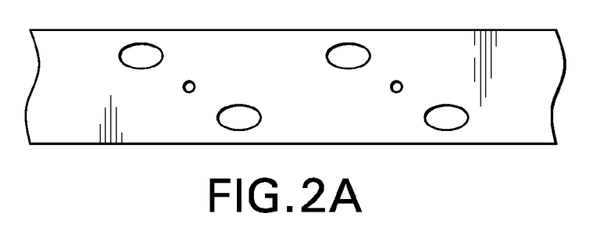
Figure 2B:
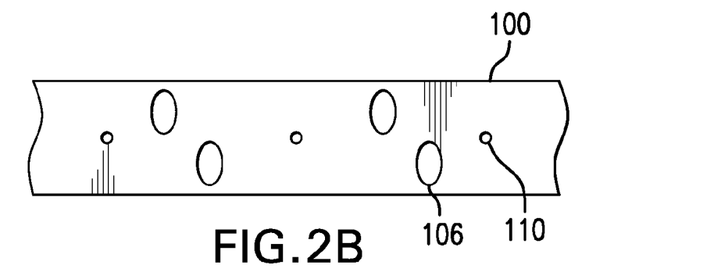

FIG. 2 is a top view of the top plate of FIG. 1 with elliptical holes for receiving piles, and round holes for receiving tightening bolts, with a hole configuration A and a hole configuration B.

Figure 3A:
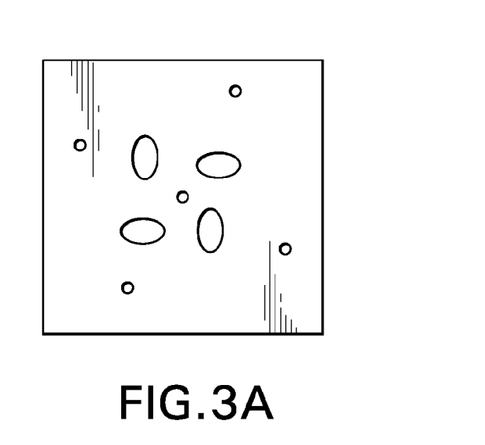
Figure 3B:
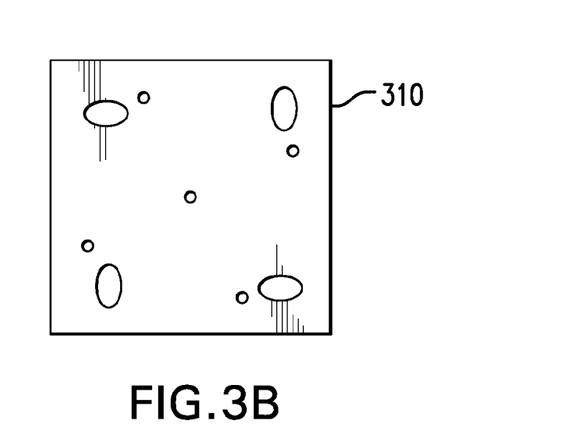

FIG. 3 is a top view of a top plate for a concentrated load version of the foundation, with a hole configuration A and a hole configuration B.

Figure 4A:
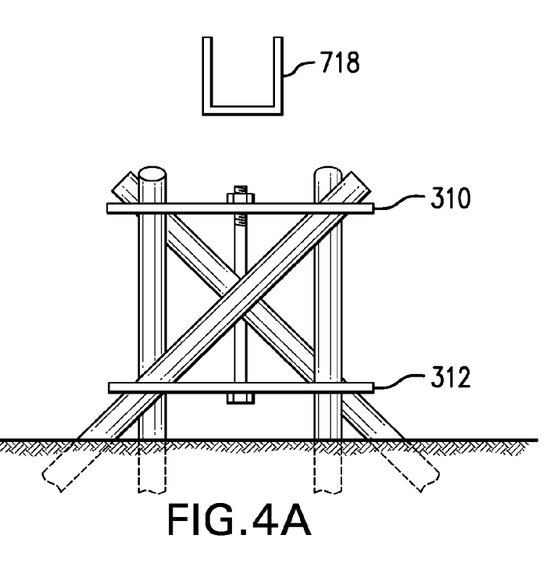
Figure 4B:
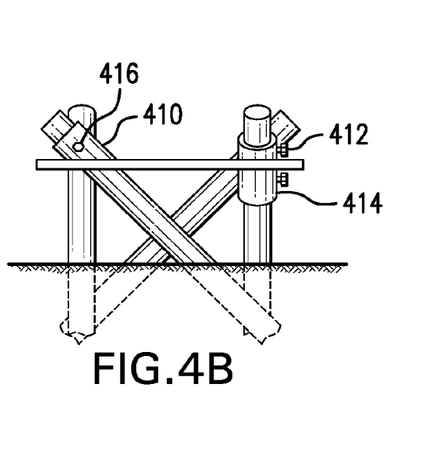
Figure 4C:
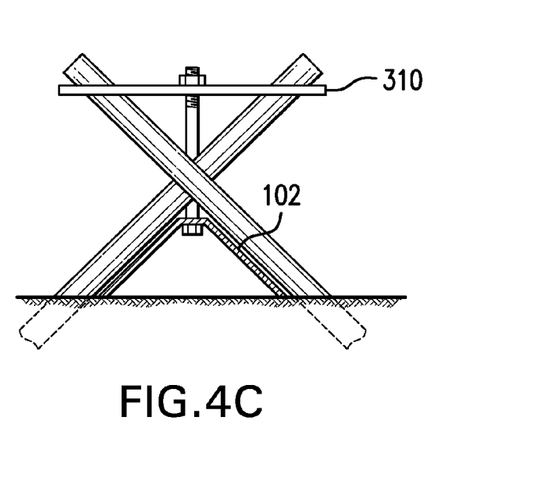

FIG. 4 is a side view of concentrated load foundations using the top plate B from FIG. 3, with a locking type A, B, and C. FIG. 4B includes locking hubs 410 and 412, through which elongated piles are inserted and locked into place. Locking hubs 410 and 412 are hollow round tubes with one side cut at an angle to match the interface of the pile and top plate (in other words, corresponding to the angle of the pile and the ellipse shaped openings in the plate). The locking hubs 410 and 412 have a small threaded opening on at least one side to allow for the insertion of set screw 416. After one end of each pile is driven through the plate, the locking hubs 410 and 412 are slid onto the piles to the point where they contact the surface of the plate and the screws are tightened against the piles. Locking hubs can also be held below the plate, for example locking hub 414, and the piles slid through so that it can be locked below the plate. The locking hubs are larger than the elliptical holes on the top plate, and when tightened, restrict any movement of the piles relative to the plate, or the plate relative to the piles, creating a lock by fixing the angle of the piles relative to the elliptical holes, as the other locking components do, and/or by stopping any sliding of the piles—in one or two directions—relative to the plate.

The plates shown in FIG. 4A are common mild steel, but may also be of spring steel, or a material with similar elastic properties, such that degrees of tightening can be developed, allowing for the presetting of a tension between the interconnected components and the upper ends of the embedded piles. Additionally, while the plates shown are flat, they may be curved, U-shaped, W-shaped, or other appropriate functional shapes.

Figure 5:
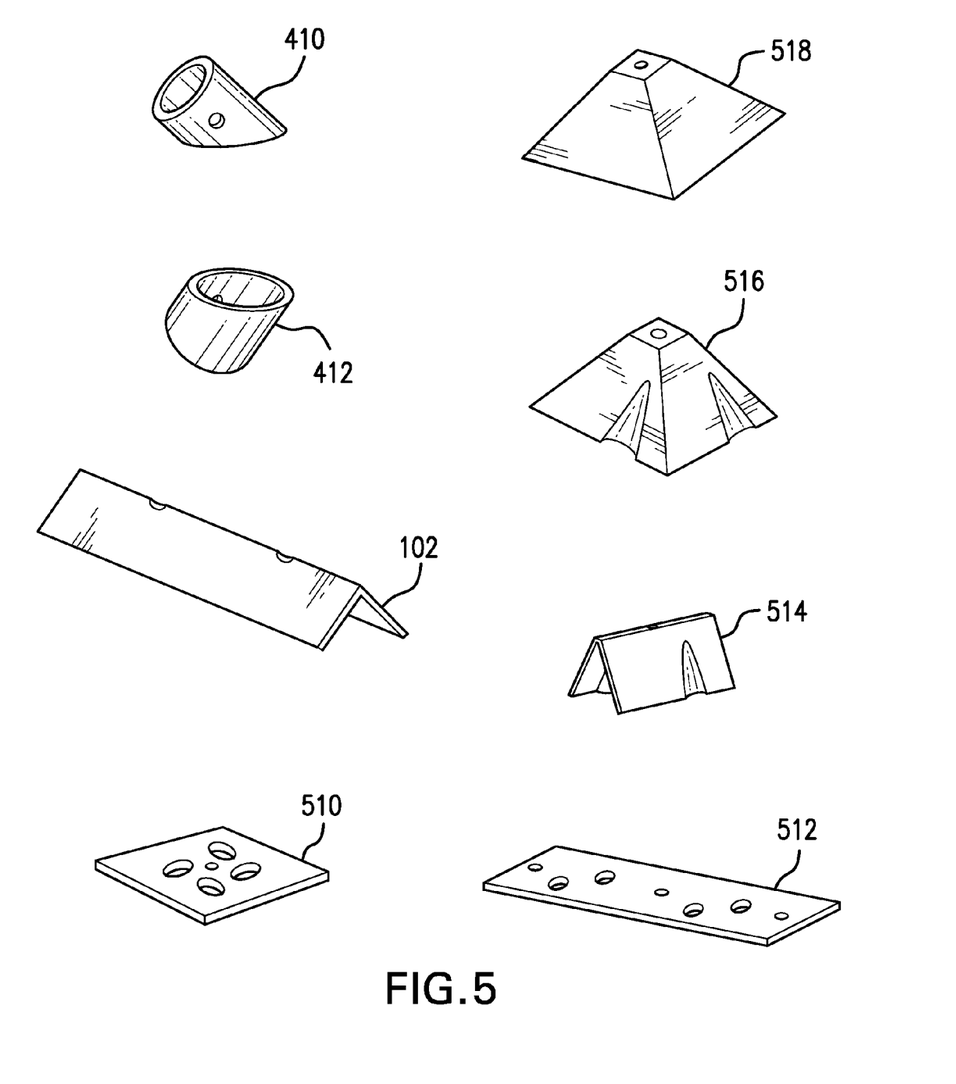

FIG. 5 is a series of perspective views of the locking components shown in FIG. 4 and FIG. 1, as well as additional variations of these components. Locking component 510 is configured to work with the top plate shown in FIG. 3A. Locking component 512 is configured to work with the top plate shown in FIG. 2B. Locking component 514 is configured to work with the top plate shown in FIG. 2A. In operation, the orientation of locking component 514 is perpendicular to locking component 102 to correspond to the orientation of the elliptical holes (and the piles into which they are driven) in the top plate in FIG. 2A. Locking component 518 is configured to work with a four pile configuration such as that shown in FIG. 4A, substituting for locking component 312. Locking component 516 is identical to locking component 518, except that it also includes shaped indents configured to receive piles such that the piles are further secured along their sides when engaged with the locking component. Other locking components may include these shaped indents as well, such as locking component 514.

Figure 6:
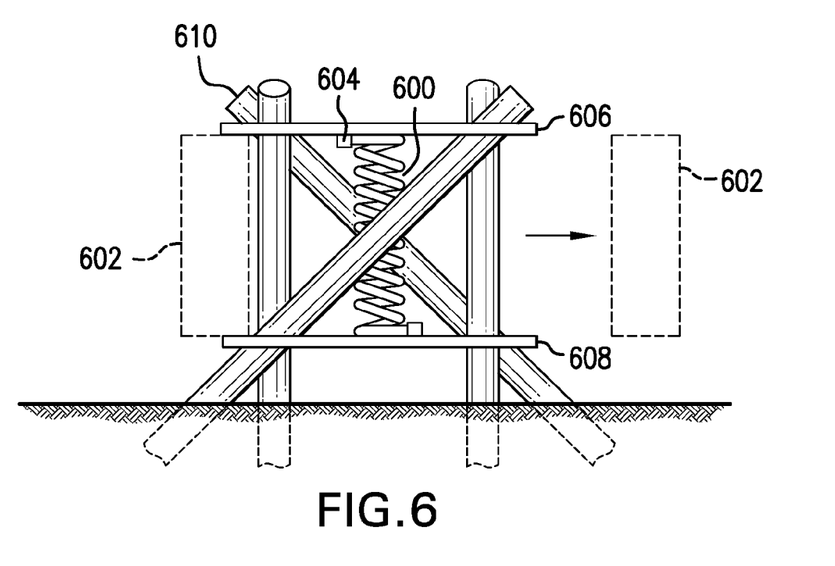

FIG. 6 is an alternative embodiment of the foundation system. In this embodiment, spring 600 and one or more removable spacers 602 are provided between the top plate 606 and the locking component 608 such that the spacers 602 keep the top plate 606 and locking component 608 at a predefined distance apart, causing the spring 600 to be expanded. After installation, one or more spacers 602 are removed causing the spring 600 to compress, which in turn causes the distance between the top plate 606 and locking component 608 to be reduced until the piles 610 engage the locking component 608, and are locked into place in the elliptical openings on top plate 606. The removable spacers 602 have angled tops and bottoms to facilitate spreading between the top plate 606 and locking component 608, and the removal of the spacers 602.

Figure 7A:
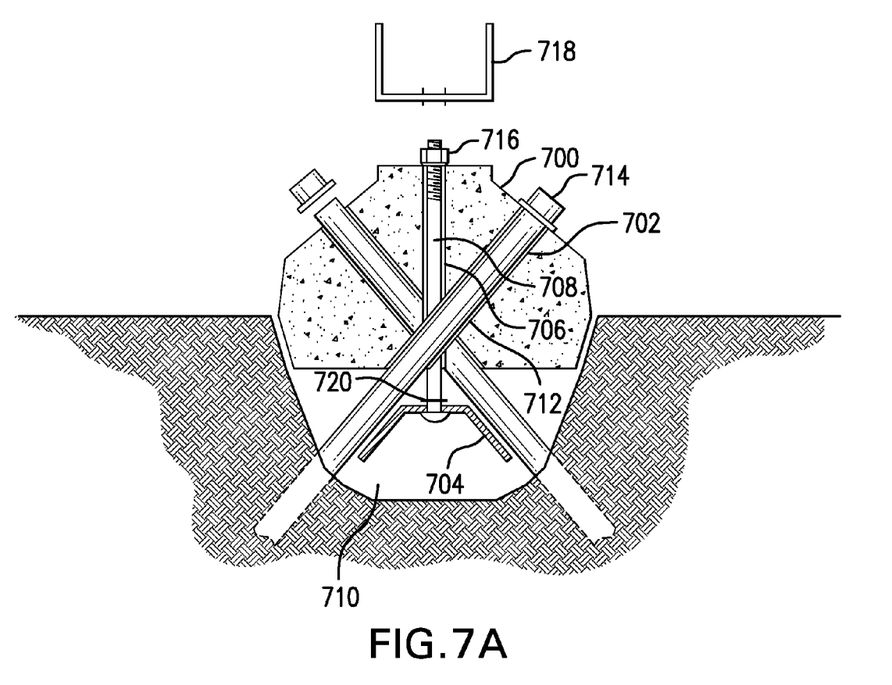
Figure 7B:
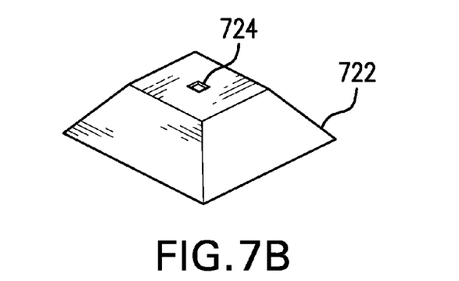
Figure 7C:
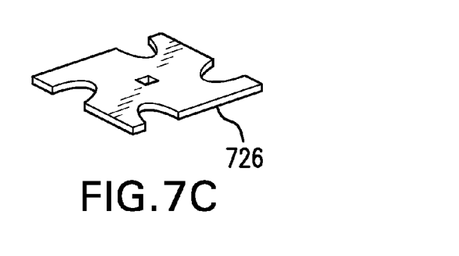
Figure 7D:
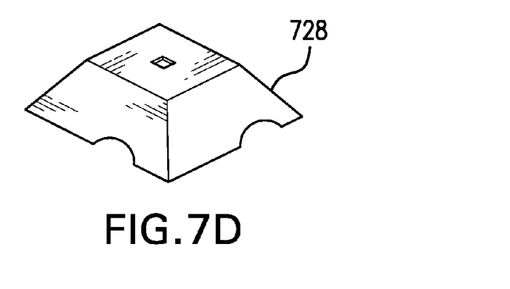

FIG. 7A is another alternative embodiment of the foundation system. In this embodiment, block 700 includes driving cavity 712 to receive piles 702. Block 700 may be comprised of concrete, wood, plastic, steel or any other appropriate material as would be recognized by one skilled in the art. Block 700 is configured to be set in a conical shaped hole 710, such that a bottom portion of the hole will allow free movement of locking component 704. Block 700 also includes bolt sleeve 706 to receive carriage bolt 708. Bolt 708 is secured via nut 716. Locking component 704 is held against the bolt head by retaining ring 720. Alternatively, the retaining ring 720 may be omitted, and bolt 708 may be welded to locking component 704. Cap 714 may be placed on piles 702 to prevent contaminants from entering the otherwise exposed open end of the piles 702. This block embodiment may be a distributed load system with a pair of pins spaced apart every few feet, such as FIG. 1, or a concentrated load system with two or more pins and appropriate locking components, such as FIG. 4A. Similarly to the previously described embodiments, the bolt is slidable within the block, either through a sleeve or a cavity, allowing the bolt to pull up on the locking component 704, causing the locking component 704 to engage piles 702, thereby binding piles 702 in their driving cavities 712. Bracket 718 can be used to attach a structure to the foundation system.

FIGS. 7B, 724, 7C, 726, and 7D, 728, are locking components that may be used with a four pin configuration. Locking component 724 has a square hole 724 to keep the carriage bolt 708 from spinning when nut 716 is being tightened. In order to further secure piles 702, locking component 726 comprises half ellipses and locking component 728 comprises notch cuts. The pyramid shape of locking components 722 and 728 are shorter and have a wider top than locking components 516 or 518, to ensure that the locking component 704 engages the piles 702 far enough below the base of the block 700 that a gap between the two is preserved that will allow for tightening and compression of the space and the binding of the piles 702 in their driving cavities 712. In a preferred embodiment, the gap preserved between the base of the block 700 and locking component 704 is a minimum of 1 inch.

Differing system configurations, soil conditions and structural functions dictate, in addition to specific angular relationships between the piles and the surface structure members, their respective sizes. In general, increasing the diameter or number of supportive piles increases their specific load resistance, as does increasing the size and strength of the locking components. However, the embodiments can all be installed, when necessary for certain site conditions, such as heaving or expansive soils, so that the components do not rest on the soil, but are instead perched above it, supported by the driven piles.

All of the above embodiments allow adjustment, where the nuts or set screws can be loosened, or spacer blocks reinserted, and, to correct for some soil movement or unique loading event, the piles, and/or plates, and/or blocks (and structures attached) can be adjusted, leveled or reset. This feature also allows all piles to be fully removable, and/or replaceable.

In a preferred embodiment the structure components and piles are raw, galvanized or painted steel, but may be of any appropriate material or alloy which possesses the necessary strength and characteristics required to remain competent and intact during installation, function in adequately transferring specific loads from the structure to the driven piles, and to sufficiently lock those driven piles under load. Corrosive protection such as galvanizing may be substituted by any number of appropriate coatings or alternative protection methods, or may not be necessary, since in some instances, such as temporary installations or the use of certain alloys or the use of the components in certain specific environments, corrosion protective coatings may not be required. Similarly, bolts in all applicable embodiments are coated steel, but may be of differing materials and/or of differing fastening styles as appropriate.

Figure 8:
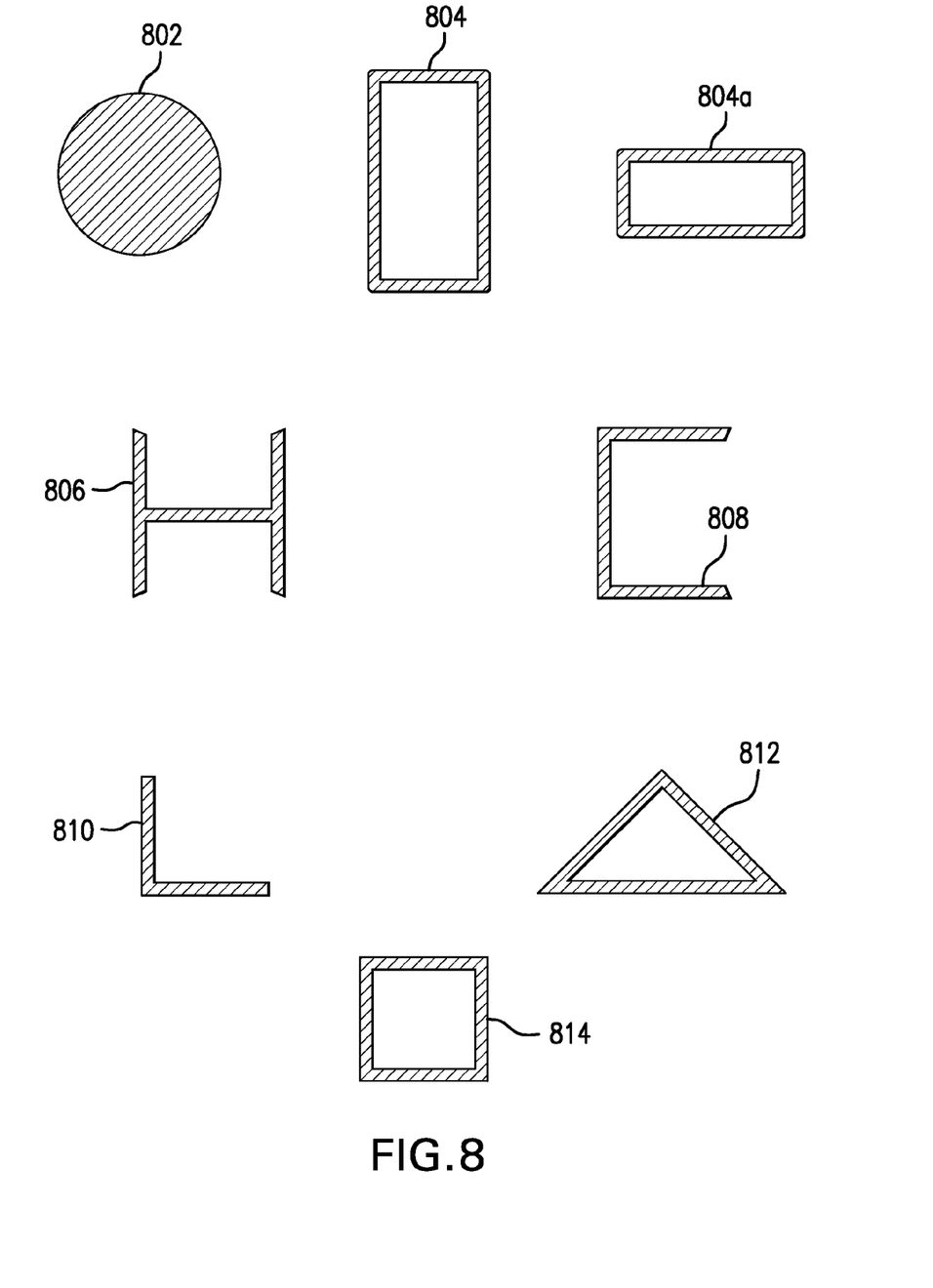
Figure 9:
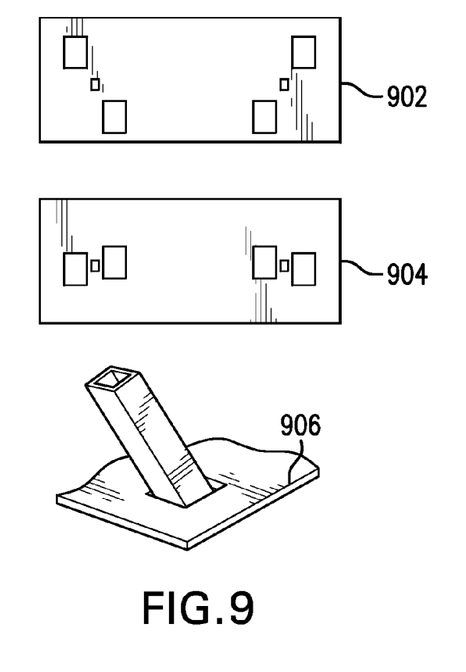

All the piles in all the figures disclosed, and in those variations of the art not specifically depicted, are of a uniform cross-section, allowing for the adequate locking effect of appropriately matched, offset driving holes or locking cavities or shapes, and can be extracted and replaced due to requirements for re-setting, corrosion or other mode of repair, or they can be extracted without being replaced in order that the supported structure be entirely removed. While the piles described in the figures above are shown with circular hollow cross-sections, it is understood to those skilled in the art that piles with various cross-sectional shapes may be used. For example, those cross-sections shown in FIG. 8: circular solid 802, rectangular 804 and 804*a*, triangular 812, H-shaped 806, C-shaped 808, L-shaped 810, and square 814. It is also understood by those skilled in the art that the holes configured to receive the piles will have a shape corresponding to the piles they are configured to receive. For example, the rectangular holes in plates 902, 904, and 906, shown in FIG. 9, are configured to receive a pile with a square cross-section, such as square 814 shown in FIG. 8. It is also noted that the perimeter of a hole configured to receive a pile will be larger than the perimeter of the corresponding pile, so that the pile can be locked at an angle (i.e., not perpendicular to the surface).

In one embodiment, caps are made of rigid thermo-plastic. These caps may likewise be substituted by any number of similar materials, or may be eliminated depending on the site conditions, material and/or cross-section of the driven piles.

Figure 10:
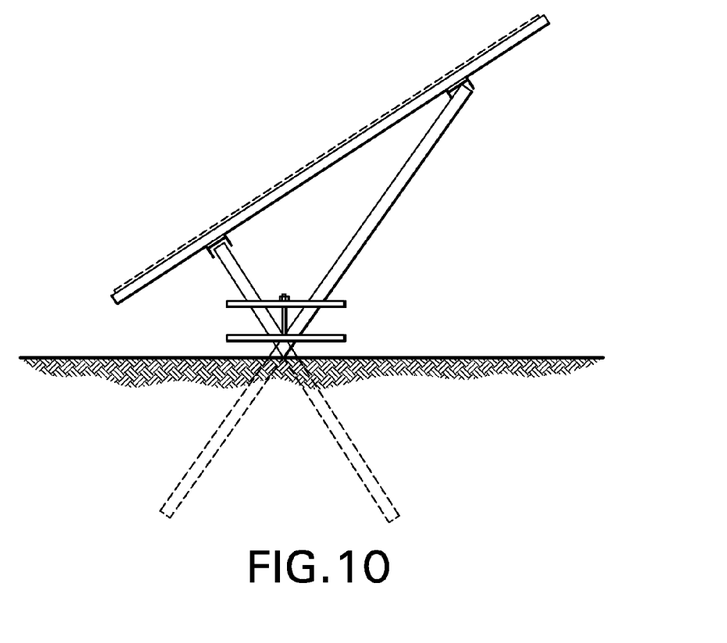

In certain embodiments, the angle of the piles range from 25 to 75 degrees depending upon the soil conditions and loading requirements, provided that driving hole plane to specific load path relationships are maintained, component to pile lock relationships are maintained, and/or ensuing surface structure relationships are maintained. In other embodiments, the angle of the piles may be less than 90 degrees or greater than 0 degrees. In preferred embodiments, the angle of two or more piles will be the same. As understood by one skilled in the art, piles may extend sufficiently above the top plate, as shown in FIG. 10, to form a supporting frame for a surface structure above, such as a floor system or in the case depicted, a solar panel.

It is to be understood that the present invention has applications aside from the example application specifically described. The above-described arrangements are merely illustrative of the principles of the present invention. Numerous modifications and adaptations thereof will be readily apparent to those skilled in the art without departing from the spirit and scope of the present invention.

What is claimed is:

1. A structural support system, comprising:
   a top plate comprising one or more openings having an inner perimeter formed as a non-circular ellipse and configured to receive elongated piles;
   a locking component configured to be connected to said top plate by one or more connectors, comprising a tightening mechanism operable to develop a compression force between said top plate and said locking component;
   wherein said locking component is configured to lock said elongated piles within said one or more openings when said tightening mechanism is utilized such that the distance between said top plate and said locking component is reduced by said compression force thereby locking said elongated piles in said one or more openings.

2. The structural support system of claim 1, wherein one or both of said top plate and said locking component is comprised of a material to allow for pre-stressing by said tightening mechanism.

3. The structural support system of claim 1, wherein the top plate is substantially flat.

4. A structural support system, comprising:
   a top plate comprising one or more openings having a full or partial an inner perimeter formed as a non-circular ellipse and configured to receive elongated piles;
   a locking component connected to said top plate by a spring, and said locking component is configured to be spread a specific distance from said top plate by one or more removable spacers, wherein said spring is expanded when said removable spacer is separating said top plate and said locking component allowing said elongated piles to be driven;
   and further wherein said spring develops a compression force when said removable spacer is removed such that the distance between the top plate and locking component is reduced by said compression force thereby locking said elongated piles in said one or more openings.

5. A structural support system, comprising:
   a form configured to receive a cementitious material in a fluid form for subsequent curing, said form dimensioned so that said cementitious material, after it has cured:
   is configured to be set in a hole such that the bottom portion of the hole remains empty to allow free movement of a locking component;
   comprises two or more cavities configured to receive elongated piles; and
   comprises a cavity to receive one or more connectors;
   the locking component configured to be connected to said cementitious material by said one or more connectors, comprising a tightening mechanism operable to develop a compression force between said locking component and said cementitious material;
   wherein said locking component is configured to lock said elongated piles within said two or more cavities configured to receive elongated piles when said tightening mechanism is utilized such that the distance between said cementitious material and said locking component is reduced by said compression force thereby locking said elongated piles in said two or more cavities configured to receive elongated piles.

6. The structural support system of claim 5, further comprising one or more linearly-tapered dowels configured to be inserted into said form to create said two or more cavities configured to receive elongated piles, wherein said two or more cavities configured to receive elongated piles are linearly-tapered.

7. The structural support system of claim 6, wherein at least one end of said one or more linearly-tapered dowels has a tapping point for loosening said one or more linearly-tapered dowels after said cementitious material has set.

8. The structural support system of claim 5, wherein said cementitious material further comprises a plurality of steel or synthetic fibers embedded in said cementitious material for primary reinforcing.

9. A method for providing foundational support, comprising the steps of:
- forming cementitious material using a form, such that said cementitious material, when cured:
  - is configured to be set in a hole such that the bottom portion of the hole remains empty to allow free movement of a locking component;
  - comprises two or more cavities configured to receive elongated piles; and
  - comprises one or more cavities to receive one or more connectors;
- driving said elongated piles through said two or more cavities configured to receive elongated piles;
- utilizing a tightening mechanism operable to develop a compression force such that the distance between said cementitious material and said locking component is reduced by said compression force thereby locking said elongated piles in said two or more cavities configured to receive elongated piles, wherein said locking component is configured to be connected to said cementitious material by said tightening mechanism.

10. The method for providing foundational support of claim 9, further comprising inserting one or more linearly-tapered dowels into said form to create said two or more cavities configured to receive elongated piles, wherein said two or more cavities configured to receive elongated piles are linearly-tapered.

11. The method for providing foundational support of claim 10, wherein at least one end of said one or more linearly-tapered dowels has a tapping point for loosening said one or more linearly-tapered dowels after said cementitious material has set.

12. The method for providing foundational support of claim 9, further comprising embedding a plurality of steel or synthetic fibers in said cementitious material for primary reinforcing.

13. A structural support system, comprising:
- a top plate comprising one or more openings configured to receive elongated piles;
- a locking component configured to be connected to said top plate by one or more connectors, comprising a tightening mechanism operable to develop a compression force between said top plate and said locking component;
- wherein said locking component is configured to lock said elongated piles within said one or more openings when said tightening mechanism is utilized such that the distance between said top plate and said locking component is reduced, creating said compression force thereby locking said elongated piles in said one or more openings.

14. The structural support system of claim 13, wherein said elongated piles have a cross-sectional shape selected from the group consisting of circular solid, rectangular, triangular, H-shaped, C-shaped, L-shaped, and square.

15. The structural support system of claim 14, wherein said one or more openings have a shape corresponding to the cross-sectional shape of the as installed elongated piles they are configured to receive.

16. The structural support system of claim 13, wherein one or more of said elongated piles are configured to extend above said top plate to support a solar panel or a level floor system.

17. A solar panel positioned and supported above the ground by the structural support system of claim 13 wherein said elongated piles extend above said top plate to provide at least in part a framework for the panel.

18. A surface structure positioned on a foundation support, wherein a plurality of structural support systems of claim 13 provide said foundation support.

* * * * *